Aug. 30, 1955  S. W. BRIGGS  2,716,491
FILTER FOR LIQUIDS

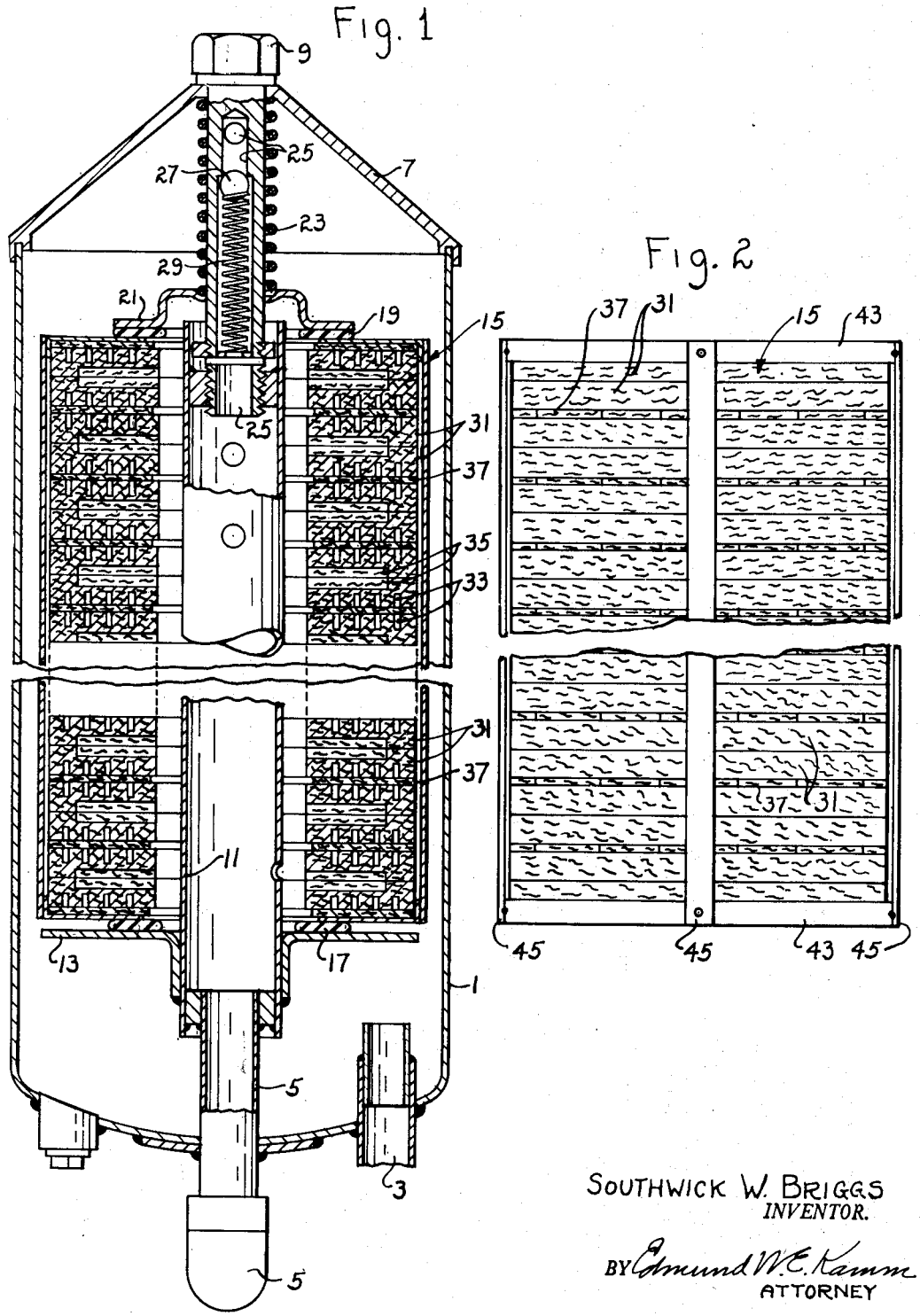

Filed Sept. 9, 1950  2 Sheets-Sheet 2

SURFACE LAYERS MORE DENSE THAN INTERIOR

SOUTHWICK W. BRIGGS
INVENTOR.

BY Edmund W. C. Kamm
ATTORNEY

United States Patent Office 2,716,491
Patented Aug. 30, 1955

2,716,491

FILTER FOR LIQUIDS

Southwick W. Briggs, Washington, D. C.

Application September 9, 1950, Serial No. 184,025

10 Claims. (Cl. 210—169)

This invention relates to a filter for liquids. More specifically, it relates to a filter having an expendable cartridge or refill which is discarded when it becomes clogged.

A further object is to provide a cartridge which is relatively long lived.

Yet another object is to provide a cartridge which will remove particles of small size.

Still another object is to provide a cartridge which is easy to manufacture.

It is still another object to produce a cartridge made up of elements which can be quickly and inexpensively manufactured and assembled.

A further object is to produce a filter cartridge which has good dimensional stability when wet.

Yet another object is to provide a filter cartridge in which the shrinkage is minimized when the cartridge is immersed in hot oil.

These and other objects will become apparent from a study of this specification and the drawings which are attached hereto, made a part hereof and in which:

Figure 1 is a vertical sectional view of the filter including the case and the cartridge.

Figure 2 is an elevation of the exterior of the cartridge.

Figure 3:
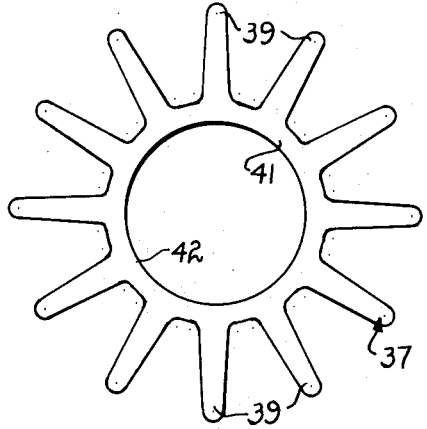
Figure 3 is a plan view of a spacer.
Figure 4:
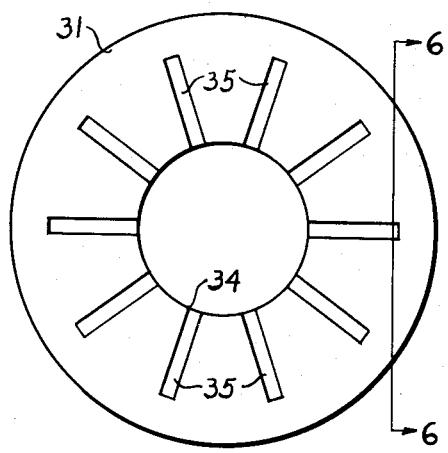
Figure 4 is a plan view of one side of the filtering disc.
Figure 6:
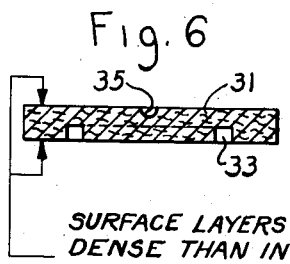
Figure 6 is a sectional view taken substantially on line 6—6 of Figure 4 showing the inlet and drain channels in the disc.
Figure 5:
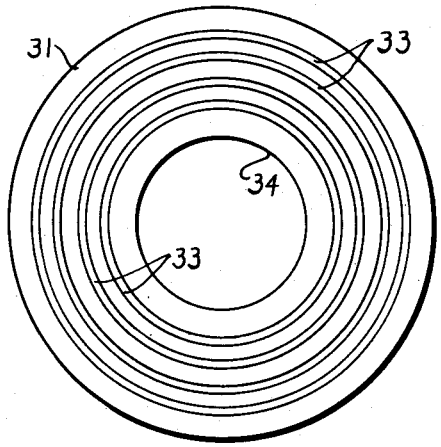
Figure 5 is a plan view of the other side of the filtering disc.

Referring to Figure 1, the numeral 1 represents the case which has an inlet 3, an outlet tube 5, and a cap 7 which is held in place by a screw 9.

The outlet tube 5 communicates with the perforated tube 11 to which is attached a lower flange 13. The cartridge indicated generally by numeral 15 rests on a seal ring 17 which is supported by the flange.

A gasket 19 rests on the top of the cartridge and a second flange 21 is slidably mounted on the bolt 9 and is yieldably held engaged with the gasket by a spring 23.

The bolt 9 is hollow and is provided with a by-pass channel 25 which is closed by a by-pass valve 27 held in closed position by spring 29. Thus, if the pressure differential across the element exceeds that for which the spring 29 is set, the valve 27 will open and allow unfiltered liquid to pass from the case 1 to the outlet 5.

The filter cartridge is made up of a series of discs 31 of wall board which is preferably one half inch thick. I prefer to use a wallboard comprised of 60% fibers made from pine spentwood and about 40% fibers made from pine green wood. The term "pine spentwood" means long leaf yellow pine from which all of the turpentine and pine oil and most of the rosin has been extracted. The term "pine green wood" means green pine fiber produced from a mixture of southern pines chiefly loblolly, short leaf, slash and some long leaf pines.

The board is made from such fibers by mixing them in a water slurry with sufficient size added to render the fibers water resistant. The slurry is felted into a mat, the water being removed by vacuum and by pressing with the resulting sheets being dried.

The board just described has excellent dimensional stability both dry and also when wet and subjected to filtering pressure and it shrinks very little when subjected to hot oils.

It has, however, a dense surface due to its method of manufacture, and therefore, to increase the rate of filtration through the board it is advisable to cut through or rupture the liquid inlet surface, as by cutting the grooves 33 described below, to expose the underlying, more porous portion of the element which is less dense than the surface. This also increases the area of the material which is contacted by the liquid which is to be filtered.

While this extension of the inlet surface area may be obtained in various ways as by drilling or otherwise cutting away portions of the inlet surface of the board to suitable depths, I prefer to make the unit as described below.

A series of circular discs 31 are cut from the board. Grooves 33 are cut in the inlet or filtering surface and a central drainage opening or passage 34 is formed therein. While the number, depth, width and form of the grooves may vary, I have successfully used four circular grooves, ⅛ inch wide and ¼ inch deep or substantially half the thickness of the board, in a 6½ inch disc having a 2⅝ inch central opening.

The other side or filtrate discharge surface of the disc is formed with a series of radial filtrate channels or drainage troughs 35 which terminate short of the periphery of the disc. I prefer that these grooves should not come closer than ¼ to ⅜ of an inch from the periphery of the discs to eliminate any possibility of by-passing liquid.

I prefer to press the grooves into the disc and to form them radially although they may be cut or otherwise formed therein and need not be radial. In fact the grooves may be entirely omitted and a drainage disc of any well known form may be used instead.

The spacer is a stellular member 37 made of chipboard or other material which need not be porous since it performs no filtering function. The points 39 of the spacer and its central ring or hub 41 are made rather narrow so that the amount of filtering disc area covered thereby is minimized. The spacer is provided with a central drainage opening 42.

The discs 31 are stacked in pairs with the sides having the radial channels together. While the channels on the contacting discs may accidentally come into alignment in manufacture, this is not deliberate, the arrangement of channels between adjacent discs is at random.

Between each group consisting of a pair of discs, a spacer 37 is placed. The orifices formed between the points of the spacers and the surfaces of the discs bearing the grooves 33 admit unfiltered liquid. The hub 41 of the spacer seals against the discs and prevents by-passing unfiltered liquid into the tube 11.

The upper and lower pairs of discs are covered by a spacer and a flanged end cap 43 is tfited over the spacer and a part of the last disc. A number of longitudinal straps 45 are welded or otherwise attached to the flanges to hold the discs and spacers in assembled relation as a cartridge.

It will thus be seen that the cartridge or refill may be installed simply by loosening screw 9 and removing cap of the filter case. The refill is then placed on gasket 17, gasket 19 installed, the cap replaced and screw 9 is drawn down to compress the gaskets and effect the necessary seals.

When the cartridge becomes filled up with foreign matter so that it is unserviceable, it can be replaced with a refill in the manner just indicated and the old element may be burned or otherwise disposed of.

It is obvious that various changes may be made in the form, structure and arrangement of parts without departing from the spirit of the invention. Accordingly, applicant does not desire to be limited to the specific embodiment disclosed herein primarily for purposes of illustration; but instead, he desires protection falling fairly within the scope of the appended claims.

What I claim to be new and desire to protect by Letters Patent of the United States is:

1. A refill cartridge for a filter comprising a number of pieces of porous wallboard material, each having a relatively dense, grooved inlet surface layer and a channelled discharge surface layer, said grooves serving to rupture the dense inlet surface layer so that liquid may enter the porous wallboard, said pieces being assembled in pairs with the discharge surface layers in contact, a filtrate passage, said channels communicating with the filtrate passage, said grooves being spaced from the passage and the periphery of the piece, a spacer mounted between adjacent pairs of pieces, having a hub portion in contact with the ungrooved inlet surface layer adjacent the passage to form a seal therewith, said spacer serving to hold said inlet surface layers apart for passage of liquid thereto.

2. A refill cartridge for a filter comprising a number of pieces of porous wallboard material, each have a relatively dense, grooved inlet surface layer and a channelled discharge surface layer, said grooves serving to rupture the dense inlet surface layer so that liquid may enter the porous wallboard, said pieces being assembled in pairs with the discharge surface layers in contact, a filtrate passage, said channels communicating with the filtrate passage, said grooves being spaced from the passage and the periphery of the piece, a spacer mounted between adjacent pairs of pieces, having a hub portion in contact with the ungrooved part of the inlet surface layer adjacent the passage to form a seal therewith, said spacer having arms extending transversely of the grooves, toward the periphery of the adjacent inlet surface layers to form channels therewith for conducting liquid to said inlet surface layers.

3. A refill cartridge for a filter comprising a number of pieces of porous wallboard material each having a relatively dense, grooved inlet surface layer and a channelled discharge surface layer, said grooves serving to rupture the dense inlet surface layer so that liquid may enter the porous wallboard, said pieces being assembled in pairs with the discharge surface layers in contact, a filtrate passage, said channels communicating with the filtrate passage, said grooves being spaced from the passage and the periphery of the piece, a spacer mounted between adjacent pairs of pieces, having a hub portion in contact with the ungrooved part of the inlet surface layer adjacent the passage to form a seal therewith, said spacer having arms extending transversely of the grooves, toward the periphery of the adjacent inlet surface layers to form channels therewith for conducting liquid to said inlet surface layers, a cap sealingly mounted on each of the endmost pairs and means engaged with said caps for holding the surface layers of said pairs and spacers in sealing relation.

4. A refill cartridge for a filter comprising a number of relatively thick elements of filtering material having an inlet surface layer and a substantially parallel discharge surface layer, depressions formed in said inlet surface layer to break it so as to admit liquid to the interior of the element and to increase the filtering area, filtrate drainage troughs formed in said discharge surface layer, said elements being stacked in pairs with one pair of like surface layers in contact, conduit means for liquid communicating with said depressions, additional conduit means for liquid communicating with said troughs and means for preventing direct communication between the first and last named conduit means.

5. A refill cartridge for a filter comprising a number of relatively thick elements of filtering material having an inlet surface layer and a substantially parallel discharge surface layer, a drainage opening connecting said surface layers, depressions formed in said inlet surface layer to break it so as to admit liquid to the interior of the element and to increase the filtering area, filtrate drainage troughs formed in said discharge surface layer, which communicate with said drainage opening, said element being stacked in pairs with their discharge surface layers in contact, means for sealing said drainage opening against direct passage of inlet liquid thereto and conduit means for inlet liquid communicating with said depressions.

6. A refill cartridge for a filter comprising a number of relatively thick elements of filtering material having an inlet surface layer and a substantially parallel discharge surface layer, depressions formed in said inlet surface layer to break it so as to admit liquid to the interior of the element to increase the filtering area, filtrate drainage troughs formed in said discharge surface layer, conduit means communicating with said troughs, said elements being stacked in pairs with their discharge surface layers in contact, spacer means disposed between each pair of elements and an adjacent pair, transversely of said depressions, to form conduit means for liquid communicating with said depressions and means for preventing direct communication between said first and last named conduit means.

7. A refill cartridge for a filter comprising a number of relatively thick elements of filtering material having an inlet surface layer which is of greater density than the interior of the element and a substantially parallel discharge surface layer, depressions formed in said inlet surface layer to break it so as to admit liquid to the interior of the element and to increase the filtering area, filtrate drainage troughs formed in said discharge surface layer, said elements being stacked in pairs with one pair of like surface layers in contact, conduit means for liquid communicating with said depressions, additional conduit means for liquid communicating with said troughs and means for preventing direct communication between the first and last named conduit means.

8. A filter cartridge comprising a number of elements of a filter material each having a relatively dense inlet surface layer and a drainage surface layer separated by a relatively porous interior portion, each element having an inlet edge normally in contact with unfiltered fluid and a discharge edge disposed in contact with filtered fluid and forming a discharge conduit, said elements being arranged in pairs with the drainage surface layers in contact, spacer means between adjacent pairs of elements defining liquid conduits communicating with the inlet surface layers to allow a flow of unfiltered fluid to the inlet surface layers of the elements, said spacer means having a sealing portion positioned between the inlet and discharge edges of the elements to prevent by-passing of the elements by unfiltered fluid, and depressions in the inlet surface layers of the elements spaced from the discharge edge and breaking the dense inlet surface layer to conduct unfiltered fluid into the porous inner portion of each element.

9. A refill cartridge for a filter comprising a number of relatively thick elements of filtering material having an exterior edge, an inlet surface layer which is of greater density than the interior of the element, a substantially parallel discharge surface layer and a less dense interior portion therebetween, at least one depression formed in said inlet surface layer to break it so as to admit liquid to the interior portion of the element and to increase the filtering area, said depression being longer than a diameter and being circumscribed by said edge, filtrate drainage troughs formed in said discharge surface layer, drainage conduit means communicating with said troughs, said elements being stacked in pairs with their discharge surface layers in contact, spacer means disposed between each pair of elements and an adjacent pair, said spacer means having projections extending outwardly between the adjacent filtering surface layers of adjacent pairs of elements and transversely of said depression to form channels for unfiltered liquid communicating with said exterior edges, and sealing means for preventing direct communication between said channels and said drainage conduit.

10. A filter cartridge comprising a number of elements of a wallboard filter material having a dense inlet surface layer, a dense drainage surface layer and a more porous portion therebetween, said elements having an inlet edge disposed for contact with unfiltered fluid and a discharge edge for contact with filtered fluid, the elements arranged in pairs with the drainage surface layers in contact, spacers between adjacent pairs of elements to allow flow of unfiltered fluid to the inlet surface layer of the elements, said spacers positioned between the inlet and discharge edges of the elements to prevent by-passing of the elements by unfiltered fluid, depressions in said inlet surface layer of each element spaced from the discharge edge of the element, said depressions providing openings in the inlet surface layer of the element allowing flow of unfiltered fluid into the body of filter material forming the elements, and depressions in the drainage surface layer of each element extending from a point spaced from the inlet edge to the discharge edge thereof.

References Cited in the file of this patent

UNITED STATES PATENTS

| | | |
|---|---|---|
| 984,704 | Rarick | Feb. 21, 1911 |
| 1,726,035 | Loew | Aug. 27, 1929 |
| 1,790,178 | Sutherland, Jr. | Jan. 27, 1931 |
| 1,883,526 | Bryan | Oct. 18, 1932 |
| 2,148,708 | Orr | Feb. 28, 1939 |
| 2,269,725 | Malanowski | Jan. 13, 1942 |
| 2,298,980 | Sloan et al. | Oct. 13, 1942 |
| 2,321,985 | Briggs | June 15, 1943 |
| 2,375,765 | Briggs | May 15, 1945 |
| 2,411,341 | Shepard | Nov. 19, 1946 |
| 2,444,147 | Walton | June 29, 1948 |
| 2,457,122 | Burley | Dec. 28, 1948 |
| 2,495,095 | Ewbank | Jan. 17, 1950 |
| 2,501,582 | Rohland | Mar. 21, 1950 |
| 2,539,768 | Anderson | Jan. 30, 1951 |
| 2,583,423 | Hallinan | Jan. 22, 1952 |
| 2,651,417 | Malanowski | Sept. 8, 1953 |

FOREIGN PATENTS

| | | |
|---|---|---|
| 531,044 | Great Britain | Dec. 27, 1940 |